United States Patent [19]
Ernst

[11] 3,711,764
[45] Jan. 16, 1973

[54] NOISE EXCITED RESONANCE APPARATUS

[75] Inventor: Richard R. Ernst, Winterthur, Switzerland

[73] Assignee: Varian Associates, Palo Alto, Calif.

[22] Filed: May 28, 1970

[21] Appl. No.: 41,417

[52] U.S. Cl. .................................................324/.5 R
[51] Int. Cl. .............................................G01n 27/78
[58] Field of Search ........324/.5 A, 5 AC; 235/151.35

[56] References Cited

UNITED STATES PATENTS

| | | | |
|---|---|---|---|
| 3,287,629 | 11/1966 | Varian | 324/.5 |
| 3,461,381 | 8/1969 | Nelson | 324/.5 |

OTHER PUBLICATIONS

Hewlett-Packard Journal, September 1967, pp. 18-20.

Primary Examiner—Michael J. Lynch
Attorney—Stanley Z. Cole and Vincent W. Cleary

[57] ABSTRACT

Noise excited radio frequency spectrometers are disclosed wherein resonance of a sample of matter disposed in a polarizing magnetic field is excited by applying noise energy to the sample to excite a spectrum of resonance lines within the sample under analysis. In one embodiment, a sample of the exciting noise is Fourier transformed and a sample of the resultant noise excited spectrum of the sample is similarly Fourier transformed and the two Fourier transformed functions are multiplied to derive a resonance spectrum of the sample under analysis. In another embodiment, a sample of the resonance exciting noise signal is cross-correlated with a sample of the noise excited resonance signal derived from the sample to obtain a cross-correlation function which is Fourier transformed to obtain a resonance line spectrum of the sample under analysis.

9 Claims, 6 Drawing Figures

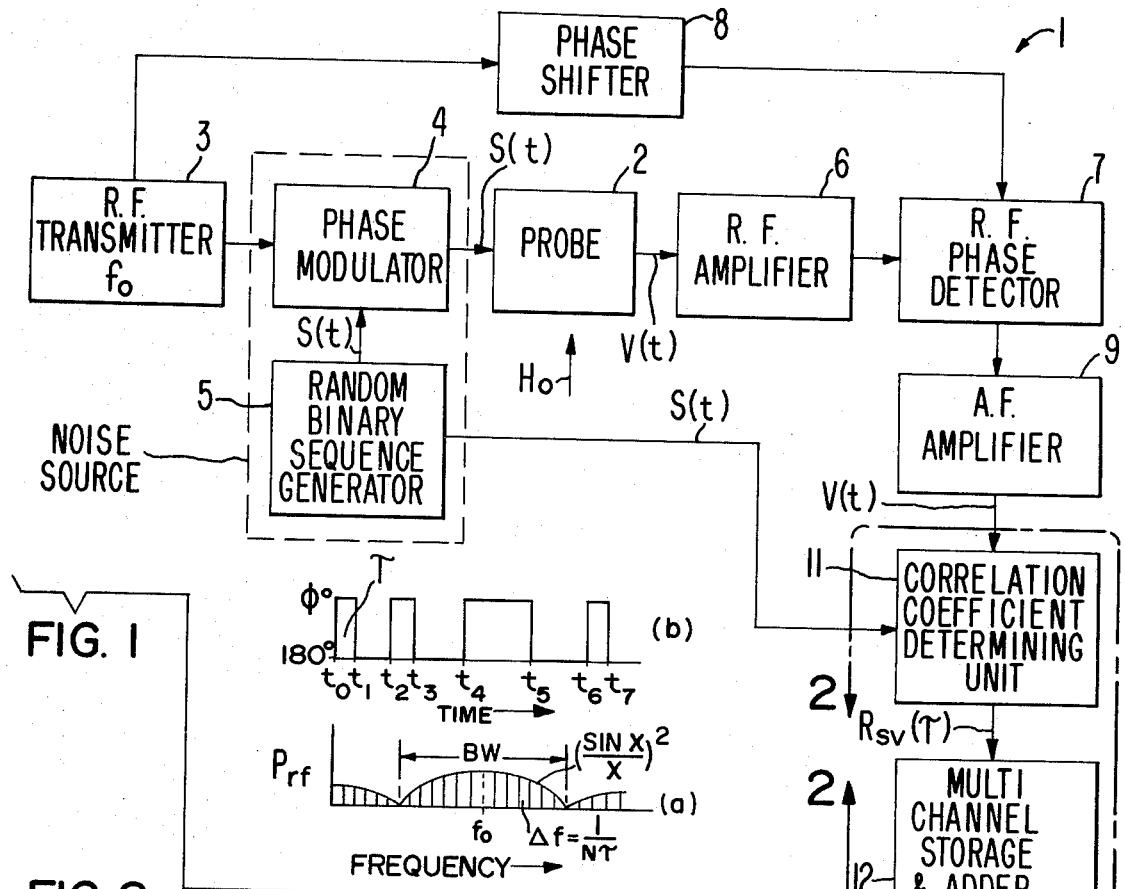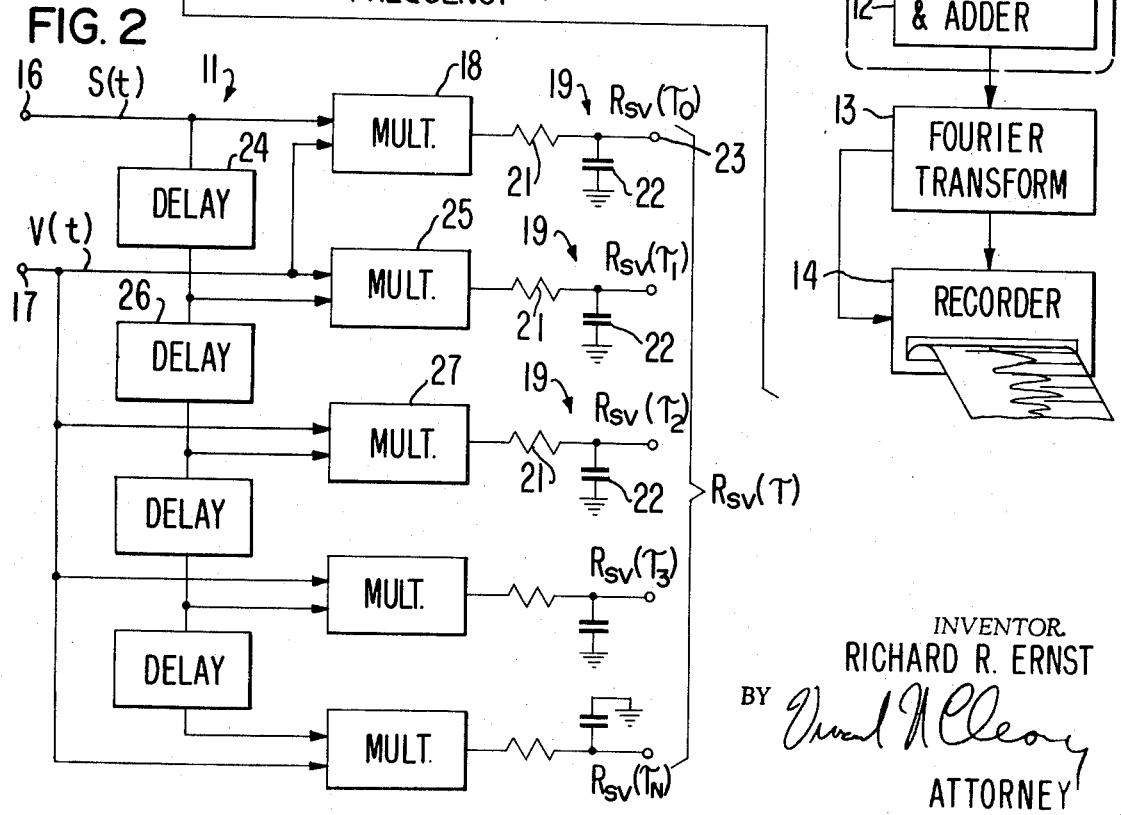

INVENTOR.
RICHARD R. ERNST
BY
ATTORNEY

NOISE EXCITED RESONANCE APPARATUS

DESCRIPTION OF THE PRIOR ART

Heretofore, noise excited resonance radio frequency spectrometers have been proposed wherein a band of radio frequency noise was applied to a sample disposed in a polarizing magnetic field to excite simultaneous resonance of a plurality of resonance lines within the sample. The composite noise excited resonance signal was then picked up and recorded. The recorded signal was Fourier transformed (analyzed) to derive the separate Fourier frequency components of the resonance spectrum of the sample under analysis. Such a spectrometer is disclosed and claimed in U.S. Pat. No. 3,287,629 issued Nov. 22, 1966 and assigned to the same assignee as the present invention. The output spectrum from this prior art spectrometer comprised a power spectrum of the sample under analysis. Such a power spectrum comprises a combination of both the dispersion and absorption modes of resonance and therefore neither mode was separately observable. Sometimes it is desired to observe either the dispersion or the absorption mode resonance.

In another prior art spectrometer, noise energy was applied to a sample of gyromagnetic bodies disposed in a polarizing magnetic field to simultaneously excite a resonance line spectrum of the sample under analysis. The noise energy used to excite resonance of the sample was derived by means of long repetitive pseudorandom binary sequence which was used to phase modulate an RF transmitter to derive an RF spectrum of radio frequency noise energy having a spectral density following a $(\sin x/x)^2$ distribution. The resultant noise excited composite resonance signal emanating from the sample was sampled in a multitude of of time displaced intervals in synchronism with binary sequence of the pseudorandom binary sequence used to derive the noise excitation. On each repetitive cycle of the pseudorandom binary sequence, the resultant resonance signal was sampled at the same successive time displaced intervals and the resonance signal amplitude at each of the time displaced sampling points was stored in a corresponding channel of a memory such that the information for successive binary sequences was accumulated in each of a number of the channels in the memory to obtain a time averaged composite resonance signal which was then Fourier transformed to derive the separate Fourier resonance line components of the sample under analysis. Due to the synchronization of the sampling points of the resonance signal with the pseudorandom binary sequence employed to excite the sample, either the dispersive or absorption mode resonance line components could be derived from the Fourier transformed resonance signals. Such a radio frequency spectrometer is disclosed and claimed in copending U.S. application Ser. No. 847,859 filed Aug. 6, 1969, now U.S. Pat. No. 3,581,191, and assigned to the same assignee as the present invention. In this prior spectrometer, the Fourier analysis was performed by means of a Fourier transform computer and the computer was programmed to take advantage of the fact that the Fourier transform for the pseudorandom noise excitation was precisely known and taken into account in the Fourier transform program of the computer.

SUMMARY OF THE PRESENT INVENTION

The principal object of the present invention is the provision of improved noise excited resonance method and apparatus.

One feature of the present invention is the provision, in a noise excited resonance apparatus, of a means for correlating the resonance exciting noise spectrum with the noise excited resonance line spectrum derived from the sample under analysis to obtain a cross-correlation function, and means for Fourier analyzing the cross-correlation function to obtain a resonance line spectrum of the sample under analysis.

Another feature of the present invention is the provision in a noise excited resonance apparatus, of means for Fourier transforming a sample of the resonance exciting noise energy to derive an exciting noise transform function and means for Fourier transforming the noise excited resonance signal emanating from the sample to derive a resonance signal transform function, and means for complex multiplying the resonance exciting noise transform function by the resonance transform function of the sample to obtain a resonance spectrum of the sample under analysis.

Other features and advantages of the present invention will become apparent upon a perusal of the following specification taken in connection with the accompanying drawings wherein:

BRIEF DESCRIPTION OF THE DRAWINGS

FIG. 1 is a schematic block diagram of a noise excited resonance spectrometer incorporating features of the present invention, FIG. 2 is a schematic circuit diagram of a portion of the structure of FIG. 1 delineated by line 2—2.

DESCRIPTION OF THE PREFERRED EMBODIMENTS

Figures 3, 6:
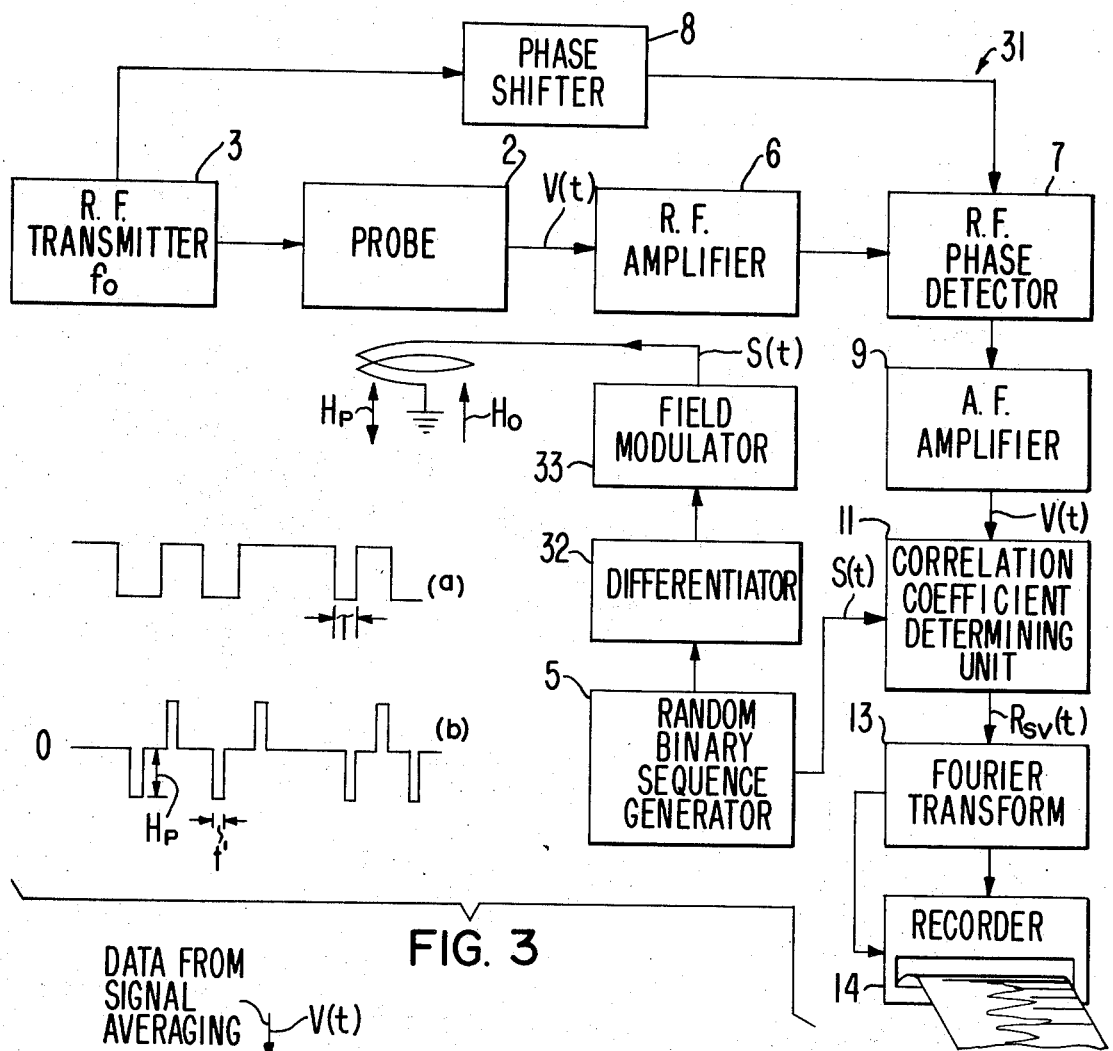
FIG. 3 is a schematic block diagram of an alternative spectrometer to that of FIG. 1.
FIG. 6 is a schematic flow diagram, in block diagram form, depicting the program and functions performed in the computer of the spectrometer of FIG. 5.

Referring now to FIG. 1, there is shown a gyromagnetic resonance radio frequency spectrometer 1 incorporating features of the present invention. The spectrometer includes a probe structure 2 for immersing a sample of gyromagnetic resonance material, to be analyzed in a polarizing magnetic field, $H_o$. The probe structure includes conventional resonance circuits disposed in radio frequency energy exchanging relation with the sample, such circuits being decoupled from each other.

A radio frequency transmitter 3 produces radio frequency energy at a frequency $f_o$ disposed at one end of the spectrum of the sample to be excited. The transmitter supplies the energy to the probe 2 via a phase modulator 4 which is arranged to modulate the phase of the transmitter signal by 180° at intervals as determined by an input signal derived from a random binary sequence generator 5. The phase modulated RF energy fed to the probe 2 excites a resonance circuit within the probe 2 to produce a radio frequency magnetic field coupled to the sample with the magnetic vector of the RF field having a strong component at right angles to the polarizing magnetic field vector $H_0$.

The random binary sequence generator 5 can produce a completely random binary sequence that is non-repetitive or it can be designed to produce a pseudorandom binary sequence, such pseudorandom binary sequence comprising a relatively long sequence of binary outputs, i.e., 66000 bits during a sequence, which are random within the sequence and such sequence being repetitive. In the case where the random binary sequence is completely random, i.e., non-repetitive, with arbitrary switching times, the phase modulator 4 combined with the binary random sequence generator 5 constitutes a white noise source producing a wideband of RF energy uniformly distributed over the expected bandwidth of the spectrum of the sample to be excited. In the case where the random binary sequence is pseudorandom, i.e., repetitive, with switching times corresponding to multiples of the basic step length RF energy applied to the sample will have an envelope, as a function of frequency, which is a $(\sin x/x)^2$ function, with $X = \pi(f - f_o)\tau$. The first mode has a bandwidth BW of $2/\tau$ where $\tau$ is the time of a basic step length in the sequence. The basic step length $\tau$ is illustrated in the waveform (b) of FIG. 1 which waveform constitutes the binary output of the sequence 5 and $\tau$ constitutes the minimum time between successive phase shifts, such time $\tau$ being illustrated in waveform FIG. 1(b) as $(t_1 - t_o)$. The total time T for each pseudorandom sequence is $\tau N$, where N is the total number of basic step lengths in the pseudorandom sequence. In a typical example, the pseudorandom sequence is one second long and contains 65,535 step lengths. At the end of the pseudorandom binary sequence, the sequence repeats itself.

The spectral lines of the transmitted signal will have a frequency separation $\Delta F = 1/\tau$. Thus, for the case previously mentioned, the frequency separation of the Fourier components in the pseudorandom noise is one Hz and the bandwidth is 131,070 hertz. Typically, only one half of the total available bandwidth is to be employed by positioning $f_o$ to one end of the spectrum of the sample to be excited, therefore, the available bandwidth is 65,535 Hz which is typically more than adequate to cover the spectrum of proton samples and is also adequate to cover the spectrum of most fluorine compounds.

The phase modulated transmitter signal is applied to the probe 2 for simultaneously exciting the various spectral lines of the sample under analysis to produce a composite resonance signal having a time-varying envelope. The composite resonance signal is received in radio frequency amplifier 6 and amplified and fed to one input of a radio frequency phase sensitive detector 7 where it is phased detected against a reference signal derived from the radio frequency transmitter 3 at the carrier frequency $f_o$. A phase shifter 8 is provided for adjusting the phase of the reference signal, if desired.

The output of the radio frequency phase detector 7 is a composite resonance signal having a time varying envelope, such signal having been transformed to the audio frequency range via the phase detector 7. The audio output of phase sensitive detector $7v(t)$ is amplified in an audio frequency amplifier 9 and fed to one input of a correlation coefficient determining unit 11 for cross-correlation with a sample of the audio frequency random binary output of sequence generator 5 which corresponds to the noise exciting function $S(t)$ applied to the sample for noise excitation of resonance therein. As used herein, the noise exciting function shall be defined as $S(t)$ and the noise excited response in the sample under analysis shall be defined as $V(t)$ and the correlation coefficient determining unit 11 correlates the noise exciting function $S(t)$ with the noise excited response $V(t)$ to derive a cross-correlation function $R_{sv}(\tau)$.

From the theory of linear systems it is known that a linear time independent system can be characterized by the response to a noise perturbation with a frequency independent power spectral density function $W_{ss}(f)$, usually called white random noise. The cross-correlation function $R_{sv}(\tau)$ of the perturbation $S(t)$ and the response $V(t)$ is proportional to the system impulse response $h(\tau)$ which is the Fourier transform of the transfer function $Y(f)$ with $$R_{sv}(\tau) = \overline{S(t)V(t+\tau)} = h(\tau) \qquad (1)$$

The bar denotes an ensemble average which, for an ergodic random process $S(t)$, is equivalent to a time average. It is assumed that $S(t)$ has a power spectral density normalized to $W_{ss}(f) = 1$.

The systems of magnetic resonance, nuclear or electronic spin systems, are non-linear systems in general. Such systems are not uniquely characterized by equation (1). However, it has been shown that Gaussian random noise with frequency — independent power spectral density still is a most appropriate means to characterize non-linear systems. Here, in contrast the linear systems, the probability distribution of the random noise becomes important. It is possible to represent the response of a non-linear system to a Gaussian random input as an expansion in stochastically orthogonal Hermite polynomials, the different terms represent the linear, quadratic, cubic, etc. responses of a non-linear system. The linear term is equivalent to equation (1).

The correlation coefficient determining unit 11 may comprise a digital computer or may comprise an analog correlator with delays, multipliers, and storage elements as shown in FIG. 2 for solving equation (1).

The cross-correlation function output of correlator 11 is fed to the input of a multi-channel storage and adder 12 wherein it is time averaged and the output of the multi-channel storage and adder 12 is Fourier transformed by a Fourier transformer 13, such as a Fourier transform computer such as a Varian Data machine computer Model 620 i to produce an output spectrum of the sample under analysis which is fed to a recorder 14 for recording as a function of frequency of time derived from the Fourier transformer 13.

Referring now to FIG. 2, the correlator 11 utilizing the analog elements is disclosed in greater detail. The correlator 11 includes a first input terminal 16 to which either the exciting noise signal $S(t)$ or the noise excited response signal $V(t)$ is applied. A second input terminal 17 has the other signal applied thereto, namely, the noise excited response V(t) or the noise exciting signal S(t), respectively. The input which is applied to input terminal 16 is fed to one input of a first multiplier 18 wherein it is multiplied with the other input signal applied to input terminal 17 to derive an output $R_{sv}(\tau o)$ =$R_{sv}(o)$ which is fed to an input of an integrator 19 comprising series resistor 21 and shunt capacitor 22. Shunt capacitor 22 serves as a storage element and the integrated output signal appears on an output terminal 23.

A first delay element 24 delays a portion of one of the input signals relative to the other by a time interval $\tau_1$. The delayed output of delay 24 is fed to one input of a second multiplier 25 wherein it is multiplied with a sample of the second undelayed input signal V(t) to derive a second cross-correlation output component $R_{sv}(\tau_1)$ appearing across the storage capacitor 22 of a second integrator 19. The output of the first delay 24 is also fed to a second delay 26 which further delays the noise exciting signal S(t) so the total delay is now $\tau_2$. The output of delay 26 is fed to one input of a third multiplier 27 for multiplication with an undelayed sample of the noise excited response signal V(t) to derive a third cross-correlation output component $R_{sv}(\tau_2)$. Thus, in the correlator 11, the noise excited resonance response V(t) is successively multiplied with a successively delayed portion of the noise exciting signal S(t) and the output, which forms the cross-correlation component appears across a succession of storage capacitors 22, there being a multitude of successive delay units and multipliers to derive a multitude of cross-correlations outputs. Should all the delay units have the same delay time $\tau$ then $\tau_n = n\tau$. The outputs are integrated across the storage capacitors 22 to provide a time average of the cross-correlation functions. The time averaged components are then Fourier analyzed by Fourier transformer 13 to produce the output resonance line spectrum. As an alternative to the use of a multitude of delay units, multiplier units, and integrators, a single delay and a single multiplier may be employed on a time share basis with the successively derived output signals being fed to a multi-channel storage and adder which stores the respective outputs in successive channels for subsequent Fourier analysis.

Referring again to FIG. 1, in the case that the random binary sequence generator 5 is a pseudorandom binary sequence generator producing a random sequence which repeats itself, the output of the audio frequency amplifier 9 may be fed to a multi-channel storage and adder unit which samples the audio frequency noise response V(t) at a multitude of time displaced points and stores the sampled information in respective channels of the multi-channel storage and adder, such storage and adder being synchronized with the basic unit step rate and cycle of the pseudorandom binary sequence generator such that each repetitive noise excited output V(t) corresponding to each cycle of the pseudorandom sequence generator is sampled at the same time displaced intervals with corresponding sampled signal amplitudes being accumulated in the same respective channels of the multi-channel storage and adder for obtaining a time average of the noise excited resonance response V(t).

The time averaged response V(t) may then be fed out of the multi-channel storage and adder to the correlation coefficient determining unit 11 for comparison with the noise exciting response S(t) corresponding to a single cycle of the pseudorandom binary sequence, since this exciting response will be the identical for each cycle of the pseudorandom binary sequence. The correlated output is Fourier transformed by transformer 13 to produce the time averaged output resonance line spectrum.

Referring now to FIG. 3, there is shown an alternative radio frequency spectrometer 31 incorporating features of the present invention. The spectrometer 31 of FIG. 3 is essentially the same as that previously described with regard to FIG. 1 with the exception that the spectrum of noise exciting energy S(t) applied to the probe 2 is applied by means of field modulation of the polarizing magnetic field. More specifically, the random binary sequence produced at the output of the binary sequence, generator 5 has a waveform as depicted by waveform (a) of FIG. 3 and this binary sequence output is fed to a differentiator 32 to produce relatively short pulses as shown by waveform (b) of FIG. 3, such pulses having a pulse duration t' and intensity $H_p$ which is either positive or negative in sign depending upon whether the output of differentiator 32 is positive or negative. The output pulse of the differentiator 32 are fed to a field modulator 13 which modulates the magnetic polarizing field $H_o$ with the pulse $H_p$ derived from pulse field modulator 33. In the case of gyromagnetic resonance, each pulse of duration t' and intensity $H_p$ is proportioned to produce 180° phase reversal of the processing gyromagnetic bodies in the polarizing magnetic field $H_o$. In other words, the phase modulation type of noise source as utilized in the spectrometer 1 of FIG. 1 can be shown to be equivalent to the field modulation noise source of FIG. 3 when the following relation is fulfilled:

$$\gamma H_p t' = \pi \qquad \text{Eq. (2)}$$

where $\gamma$ is the gyromagnetic ratio, $H_p$ is the amplitude of the magnetic field modulation and t' is the length of the pulses in the pulse sequence of a waveform (b). Additionally, it is necessary that t' be much, much smaller than $\tau$, where $\tau$ is the basic unit step length of the binary sequence.

The advantage of the field modulation, as shown in the spectrometer 31 of FIG. 3, is that the probe structure and RF amplifier 6 can be simplified since there is no direct coupling of RF energy from the transmitter into the input of the receiver 6 via the probe 2 when the transmitter frequence $f_o$ is displaced from the spectral range of interest of the sample under analysis. This avoids undersired overloading and coupling of unwanted signals into the input amplifier circuits within RF amplifier 6.

Figure 4:
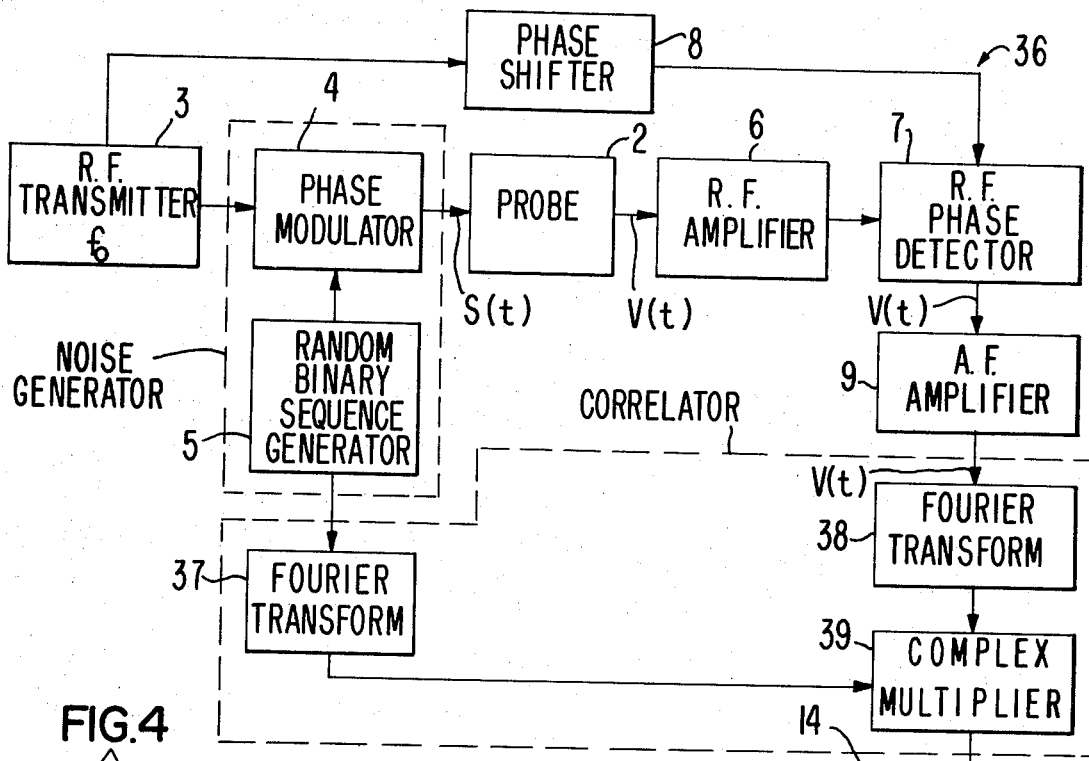
FIG. 4 is a schematic block diagram of an alternative spectrometer incorporating features of the present invention.

Referring now to FIG. 4, there is shown an alternative RF spectrometer 36 incorporating features of the present invention. Spectrometer 36 is substantially the same as the previously described with regard to FIGS. 1 and 3 with the exception that the noise energy S(t) employed to excite the resonance response V(t) is cross-correlated with the noise resonance response V(t) by Fourier transforming the noise energy S(t) in Fourier transformer 37 and also Fourier transforming the noise excited response V(t) in Fourier transformer 38 and then complex multiplying the Fourier transforms of the noise S(t) and the resonance response V(t) in a multiplier 39 to obtain the Fourier transformed resonance line spectrum of the sample under analysis which is thence fed to the recorder 14 for recording as a function of time or as a function of frequency to obtain an output spectrum of the sample under analysis. "Complex multiplying" as used herein is defined to mean multiplying of complex numbers. (See "Advanced Engineering Mathematics," C. R. Wylie Jr., McGraw-Hill 2nd Edition, 1960, p. 528).

In the spectrometer 36 for the case where the sequence generator 5 is of a pseudorandom nature, i.e., repetitive, a multichannel storage and adder may be provided between the output the audio frequency amplifier 9 and the input of the Fourier transformer 38 for repetitively sampling and accumulating the resonance response V(t) in respective channels of the storage and adder to obtain a time average of the noise excited response V(t) which is then subsequently fed to the Fourier transformer 38 to obtain a time averaged Fourier transformed output which is cross-correlated with the Fourier transform of the noise. The Fourier transform of the noise will be the same for each cycle of the pseudorandom sequence. Thus, the Fourier transform of the pseudorandom binary sequence noise excitation S(t) need not be time averaged before being fed to the multiplier 39 for multiplication with the time averaged output of the Fourier transformer 38.

As an alternative, the multi-channel storage and adder may be disposed at the output of complex multiplier 39, for a case where the sequence generator 5 produces a repetitive or pseudorandom sequence, for obtaining a time average of the resonance spectral data which may then be read out to the recorder 14. As in the spectrometer of FIG. 3 the noise excitation S(t) may be obtained by field modulation as well as phase modulation of the transmitter signal.

Figure 5:
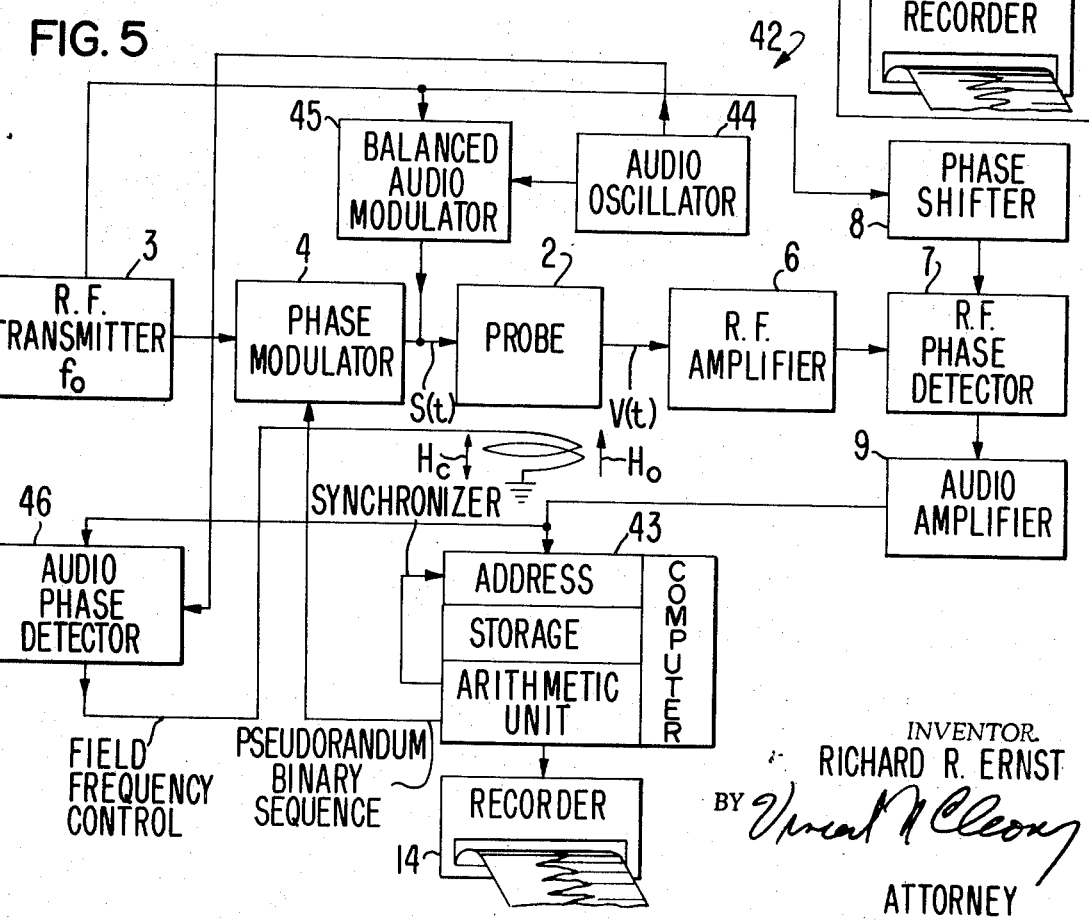
FIG. 5 is a schematic block diagram of a radio frequency spectrometer incorporating features of the present invention.

Referring now to FIG. 5, there is shown an alternative spectrometer 42 incorporating features of the present invention. The spectrometer 42 of FIG. 5 is essentially the same as that previously described with regard to FIG. 4 and consists of a small general purpose computer of the type 620 i with an 8,000 word memory manufactured by Varian Data Machines, Newport Beach, California. The interfaces between the computer 43 and the spectrometer such as a Varian Associates type DA 60 spectrometer manufactured by Varian Associates, Palo Alto, California, is done by a general interface of the type SS100 which includes A to D and D to A converters, sense and control lines.

The 620 i computer 43 generates a maximum length pseudorandom binary sequence utilizing the A register of the computer 43 as a shift register with 10 bits. One bit output of the A register of the computer 43 is used to set and reset a flip-flop register which feeds into the binary phase modulator 4 which sets the phase of the RF transmitter signal to 0 or $\tau$ according to the state of the flip-flop. The modulated RF output is amplified in a power amplifier, not shown. An RF power of approximately 50 milliwatts is employed to cover a spectral range of one kilohertz in the 60 megacycle band. The noise excited resonance response V(t) is picked up in the receiver coil within the probe 3, is amplified by RF amplifier 6, demodulated in RF phase detector 7 and fed through a lowpass filter with a 3 db frequency of 0.4 to 2 kilohertz, depending on the width of the spectrum. The audio output of the audio amplifier 9 is digitized and stored either in the memory of the computer 43 or in a time averaging computer of the type C-1024 (Varian Associates) not shown. The sampling process, for a storage, is synchornized with the exciting sequence S(t) and produces 1,023 samples per period which are added to the corresponding samples of the former priods, i.e., cycles of the pseudorandom binary sequence.

The signal processing and transformation are done after data collection. The Fourier transformed and cross-correlated output resonance line spectrum is fed through a digital-to-analog and thence to the XY recorder 14.

The flow diagram of the computer program for data processing is shown in FIG. 6. The noise excited resonance response V(t) is base line corrected by subtraction of its average value to increase the accuracy of the following fixed point operations. A conventional Fourier transform routine is employed to transform the 1,023 data points into 512 pair of complex Fourier coefficients with 15 bit accuracy. The Fourier coefficients of the noise and resonance signals are multiplied by the complex conjugate Fourier coefficients of the shift register code used for noise excitation of resonance. This produces the complex spectrum. To obtain pure absorption or a pure dispersion mode resonance line mode resonance line spectrum output, a phase correction routine is provided which allows variance of the phase of the spectrum by arbitrary angles by a linear combination of real and imaginary parts of the complex spectrum. This type of correction routine is disclosed and claimed in copending U.S. application Ser. No. 16,497 filed Mar. 4, 1970, and assigned to the same assignee as the present invention.

It is, as well, possible to sample the signal by 1024 data points per period and subsequently to use the last Fourier transform routine described by Cooley and Tuckey which considerably reduces computation time. In this case, binary random sequence and coupling must be synchronized such that during $2^n-1$ basic skips of the random sequence $2^n$ equidistant samples are taken (e.g. $n=10$).

The synchronization could be effected as follows: Assuming that the period length T shall be 1 sec, the frequency of the basic clock within the arithmetic unit must be $2^n(2^n-1)$ hertz which is divided by $2^n$ in a binary counter within the arithmetic unit to generate the shift pulses for the binary pseudorandom noise generator formed by the A register. At the same time, the basic clock frequency is divided by $2^n-1$ using a shift register with n binaries and feedback sampling times for the adder.

Field-frequency control is added to the spectrometer 42 to obtain an enhanced stability of the output spectra by use of a field-frequency control sample within the probe 3 and modulating the transmitter signal $f_o$ with an audio frequency derived from audio frequency oscillator 44 and fed to balanced audio modulator 45 to produce a side band at the resonance frequency of the control sample. The control sample resonance line output in the output of audio amplifier 9 is fed to one input of an audio phase detector 46 for phase detecting with a sample of the audio modulation signal derived from audio oscillator 44 to produce a DC error signal employed as a field-frequency control signal for superimposing a corrective magnetic field component $H_c$ upon the polarizing magnetic field to sustain resonance of the control sample, thereby stabilizing the field-frequency parameters of the spectrometer.

Although the noise excited resonance apparatus of the present invention has been described, thus far, as it is applied to gyromagnetic resonance spectrometers, particularly of the nuclear resonance types, this is not a requirement and the features of the present invention are applicable in general to spectrometers which include nuclear resonance spectrometers, electron spin spectrometers, nuclear quadrupole resonance spectrometers and may be employed not only at radio frequencies but at microwave frequencies as well. As an alternative to phase modulation of the radio frequency transmitter signal $f_o$ the radio frequency transmitter signal may be intensity modulated with the pseudorandom binary sequence or with a random binary sequence to produce noise excitation of the sample under analysis.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a noise excited nuclear and electron resonance apparatus, means for irradiating a sample of matter under investigation with a spectrum of noise energy having sufficient bandwidth to cover a plurality of resonance lines of the sample to be excited for exciting resonance of plural resonance lines of the sample simultaneously, means for receiving the simultaneously excited resonance lines signals emanating from the noise excited sample, means for correlating the resonance exciting noise energy with the noise excited resonance line signals to derive a cross-correlation function, and means for Fourier analyzing the cross-correlation function to obtain resonance line information concerning the sample under analysis.

2. The apparatus of claim 1 wherein said means for irradiating the sample with a spectrum of noise energy includes means for irradiating the sample with radio frequency energy which is modulated with noise energy.

3. The apparatus of claim 2 wherein the sample is disposed in a polarizing magnetic field and said means for irradiating the sample with noise energy includes, means for irradiating the sample with radio frequency energy, and means for modulating the intensity of the polarizing magnetic field with noise energy.

4. The apparatus of claim 3 wherein said means for correlating the resonance exciting noise energy with the noise excited energy resonance line signals comprises a plurality of channels for simultaneously multiplying said resonance line signals by different time-delayed representations of said resonance exciting noise, each said different time-delayed representation being multiplied by said resonance line signal in a separate one of said plurality of channels.

5. In a noise excited nuclear and electron resonance apparatus, means for applying a spectrum of noise energy to a sample of matter disposed in a polarizing magnetic field to excite simultaneously a spectrum of resonance lines within the sample under analysis, means for receiving the spectrum of resonance line signals simultaneously emanating from the sample, means for Fourier transforming a sample of the resonance exciting noise energy applied to the sample to derive an exciting noise transform function, and means for Fourier transforming the noise excited resonance line spectrum emanating from the sample to derive a resonance transform function, and means for complex multiplying the resonance exciting noise transform function by the resonance transform function to obtain resonance line information concerning the sample under analysis.

6. The apparatus according to claim 5 wherein said means for irradiating the sample with a spectrum of noise energy includes means for irradiating the sample with radio frequency energy which is modulated with noise energy.

7. The apparatus of claim 5 wherein the sample is disposed in a polarizing magnetic field, and said means for irradiating the sample with noise energy includes, means for irradiating the sample with radio frequency energy, and means for modulating the intensity of the polarizing magnetic field with the noise energy.

8. In a method for obtaining excited nuclear and electron resonance information from a sample under analysis the steps of, irradiating the sample under investigation with a spectrum of noise energy having a sufficient bandwidth to cover a plurality of the resonance lines of the sample to be excited for exciting resonance of plural resonance lines of the sample simultaneously, receiving the simultaneously excited resonance lines signals emanating from the noise excited sample, and correlating the resonance exciting noise energy with the noise excited resonance line signals to derive a cross-correlation function, and Fourier analyzing the cross-correlation function to obtain resonance line information concerning the sample under analysis.

9. In a method for obtaining noise excited nuclear and electron resonance information from a sample under analysis the steps of, applying a spectrum of noise energy to the sample of matter disposed in a polarizing magnetic field to excite simultaneously a spectrum of resonance lines within the sample under analysis, receiving the spectrum of resonance line signals simultaneously emanating from the sample, Fourier transforming a sample of the resonance exciting noise energy applied to the sample to derive an exciting noise transform function, Fourier transforming the noise excited resonance line spectrum emanating from the sample to derive a resonance line transform function, and multiplying the resonance exciting noise transform function by the resonance line transform function to obtain resonance line information concerning the sample under analysis.

* * * * *